Oct. 9, 1962   S. F. DRURY, JR   3,057,254
PHOTOGRAPHIC LIGHT METER
Filed Oct. 12, 1960
FIG. 2
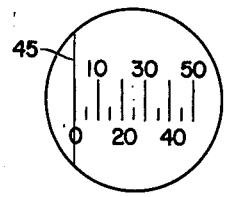
FIG. 3
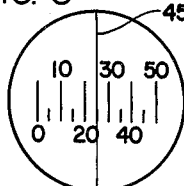
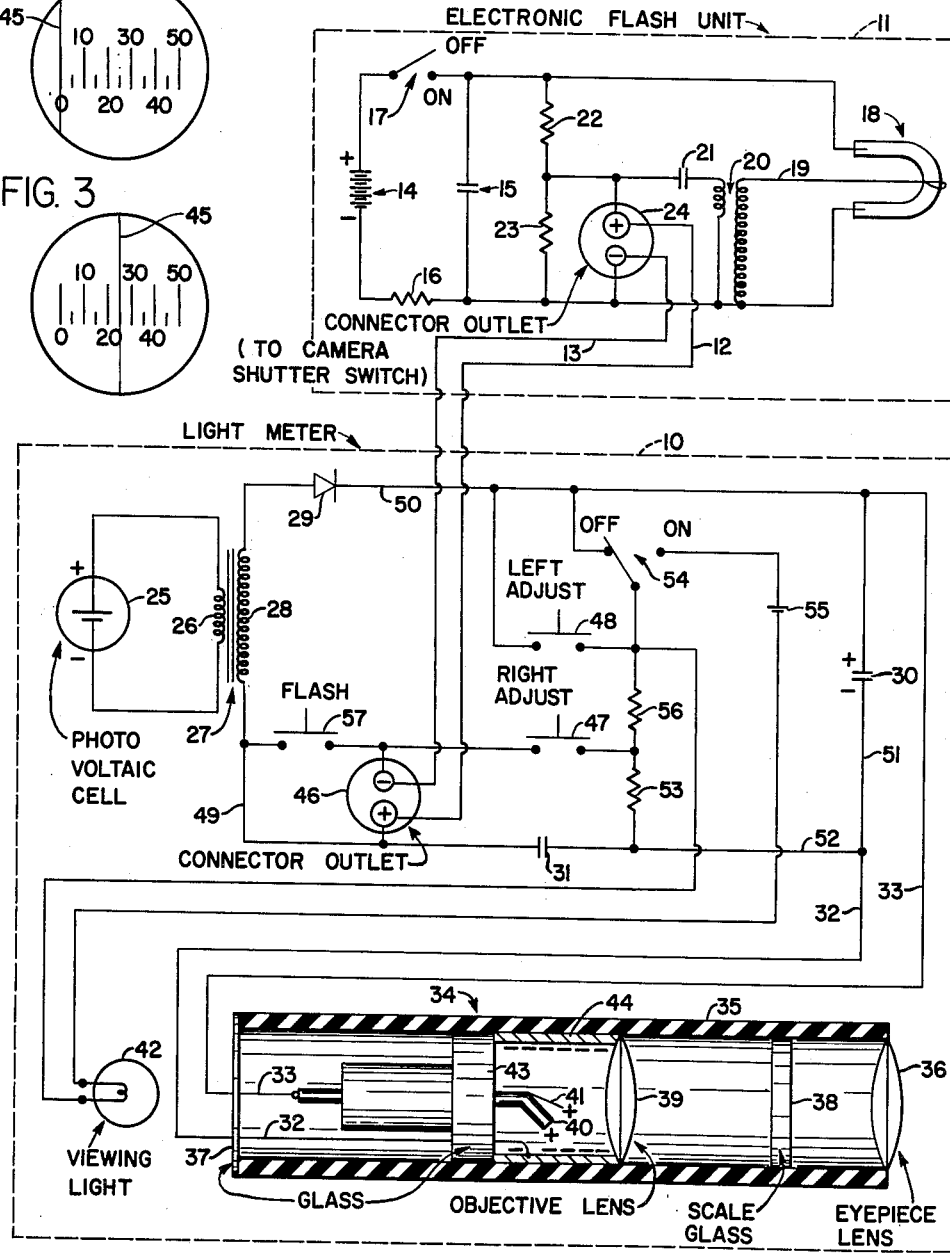
INVENTOR.
SAMUEL F. DRURY, JR.
BY
ATTORNEY

United States Patent Office 3,057,254
Patented Oct. 9, 1962

3,057,254
PHOTOGRAPHIC LIGHT METER
Samuel F. Drury, Jr., Denver, Colo., assignor to Minneapolis-Honeywell Regulator Company, Minneapolis, Minn., a corporation of Delaware
Filed Oct. 12, 1960, Ser. No. 62,253
7 Claims. (Cl. 88—23)

The present invention is concerned with an improved photographic light meter and particularly with a photographic light meter which is constructed and arranged to measure the quantity of light energy present in a sudden burst of light such as is produced by a photographic flash unit.

The present invention is to be distinguished from that class of photographic light meters which measures the quantity of ambient light illuminating a subject to be photographed to thereby facilitate the proper adjustment of a photographic camera to obtain the optimum exposure of the subject for the particular type of film utilized in the camera. Photography of this type utilizes either natural sunlight for illumination or flood type continuously energized lamps to illuminate the subject, if the photograph is to be taken indoors, for example in a photographic studio.

A further widely accepted manner of illuminating a subject, where the ambient illumination is relatively low, is by means of a photographic flash unit which contains a source of light energy whose energization is synchronized with the action of the camera shutter to brilliantly illuminate the subject to be photographed only during the relatively short time that the film in the camera is being exposed. This illumination of the subject to be photographed takes place for only a short period of time and it is standard practice for the manufacturers of the flash unit to provide what is called a "guide number." This guide number is a measure of the light energy which is available from the flash unit and from this guide number the photographer may calculate proper camera adjustment for the particular situation he is photographing.

As is readily appreciated, the guide number supplied by the flash unit manufacturer is actually an approximation of the energy which is available from this flash unit under ordinary operating conditions. If the subject to be photographed is in the vicinity of a light colored or brilliant environment, then this guide number is incorrect in one sense. If the subject to be photographed is in the vicinity of a dark light-absorbing environment, then the guide number is incorrect in an opposite sense. Furthermore, as the power source in the flash unit, conventionally batteries, age and deteriorate, then the guide number is somewhat incorrect.

The present invention provides a photographic light meter for use in measuring the quantity of energy present in a particular sudden burst of light energy and in this manner the apparatus of the present invention can be utilized to indicate the specific guide number to be used by the photographer for the particular set of conditions under which the actual photograph is to be taken. In this manner, a much more accurate indication of camera adjustment may be obtained.

Specifically, the present invention utilizes photoelectric means which is adapted to be subjected to the sudden burst of radiant light energy to produce an output voltage in response thereto. This output voltage is applied to a transformer, such that the secondary winding voltage of the transformer is indicative of only the sudden burst of light energy and is not affected by the relatively low intensity ambient light which may be illuminating the subject to be photographed. The secondary winding of the transformer is connected to an electrostatic voltmeter whose indication then provides means for measuring the quantity of energy present in the sudden burst of light energy.

The present invention further provides means whereby the electrostatic voltmeter may be calibrated to provide a reference point from which a reading may be taken. Specifically, the calibration voltage for the electrostatic voltmeter may be obtained from the shutter connector of an electronic flash unit whose guide number is to be measured.

The present invention will be apparent to those skilled in the art upon reference to the following specification, claims, and drawing, of which:

FIGURE 1 is a schematic representation of the present invention wherein the improved photographic light meter is connected to an electronic flash unit, FIGURE 2 is a showing of the scale glass of the photographic light meter, with the scale indicator being at the zero position, and FIGURE 3 is a further showing of the scale glass wherein the scale indicator is positioned to indicate a relative time integral of light intensity reading of approximately 25.

Referring specifically to FIGURE 1, the light meter is contained within the broken lines identified by the reference numeral 10. This light meter 10 is connected to an electronic flash unit, contained within the broken lines identified by reference numeral 11, and the interconnection between the units 10 and 11 is achieved by means of a photographic cord containing conductors 12 and 13.

Electronic flash unit 11 is of a conventional type in which a high voltage battery 14 is connected to a capacitor 15 to charge this capacitor through a resistor 16 and an on-off switch 17. Capacitor 15 is connected to the main current conducting electrodes of an electronic flash tube 18 whose starting electrode 19 is connected to a trigger transformer 20. Trigger transformer 20 receives its energy from a trigger capacitor 21, this capacitor being charged by means of a voltage divider consisting of resistors 22 and 23, which resistors are connected in series across capacitor 15. Reference numeral 24 identifies a polarized camera shutter connector outlet which is adapted to be connected to the shutter connector located on a camera housing. As shown in FIGURE 1, this outlet is polarized such that the upper terminal thereof is positive with respect to the lower terminal.

Referring now to light meter 10, this light meter is provided with a means sensitive to radiant light energy, this means being in the form of a photovoltaic cell 25. This cell provides an output voltage such that the upper terminal of the cell is positive with respect to the lower terminal, upon the cell being subjected to light energy. The output of this cell is connected to the primary winding 26 of a transformer 27 having a secondary winding 28. This secondary winding is connected to a diode 29 and in circuit with a first capacitor 30 and a second capacitor 31. In practice, capacitor 30 is constructed to be very small when compared to capacitor 31. In a specific embodiment of the present invention, capacitor 30 has a value of .007 microfarad, while capacitor 31 had a value of .25 microfarad.

Capacitor 30 is connected by means of conductors 32 and 33 to an electrostatic voltmeter which is designated generally by means of reference numeral 34. Electrostatic voltmeter 34 is a cigar shaped device having an outer cylinder 35 constructed of electrical insulating material. One end of this cylinder is closed by an eye piece lens 36 while the other end of the cylinder is closed by a glass member 37. Eye piece lens 36 cooperates with a scale glass 38 and an objective lens 39 to facilitate the viewing of element 41 which is illuminated by means of a viewing light 42.

Elements 40 and 41 are essentially an electrometer wherein member 40 is stationary and mounted in a glass supporting member identified by reference numeral 43. This glass supporting member, in combination with glass member 37, facilitates the illumination of members 40 and 41 by the viewing light 42. Member 41 is a small, light weight, quartz fiber which is movable relative to member 40.

Members 40 and 41 are surrounded by a conducting cylinder 44. Member 44 is connected to conductor 32 whereas member 40, and likewise member 41, is connected to conductor 33. In this manner, the voltage present on capacitor 30 is applied to members 40, 41 and 44. Members 40 and 41 are charged to a like polarity and are charged opposite to member 44. As a result, member 41 is displaced from member 40 to an extent determined by the quantity of charge on capacitor 30. As will be explained, the quantity of charge on capacitor 30 is an indication of the light energy available in a sudden burst of light to which the photovoltaic cell 25 has been subjected.

Lenses 36 and 39 and scale glass 38 are constructed and arranged such that the position of movable member 41 is read on the scale glass to indicate the amount of light energy available in the sudden burst of light. This reading can then be related to the ASA speed of the film utilized with the photographer's camera to obtain a reading of guide number for that particular situation which the photographer is then photographing. For example, FIGURE 3 shows the scale glass wherein the indicator line 45, actually the shadow of member 41, indicates a time integrated intensity reading of 25. This reading can then be related to a table of ASA film speeds to obtain a guide number reading or to obtain indications of proper camera adjustment for the particular selected film. If desired, the readings of the scale glass as shown in FIGURES 2 and 3 may be directly in guide number readings for one particular film speed, and a conversion table could then be utilized for other speed films.

In any event, the position of member 41, as read on scale glass 38, is an indication of quantity of light.

In actual practice, in order to position member 41 at the zero of the light intensity scale, as shown in FIGURE 2, it is necessary that a reference voltage be present on capacitor 30. This reference voltage may be derived from an external source of voltage which is adapted to be connected to a connector outlet identified by means of reference numeral 46. In FIGURE 1, this connector is shown connected by means of conductors 12 and 13 to the camera shutter connector outlet 24 of the electronic flash unit 11. As thus connected, conductor 12 has a positive voltage applied thereto with respect to conductor 13. This has been indicated by the polarity markings on connector 46. Such a polarity, however derived, is necessary for proper operation of the calibrating arrangement for the electrostatic voltmeter 34.

FIGURES 2 and 3 show scale glass 38 as it is viewed in a normal range of positions. The showing of scale glass 38 and the associated components of electrostatic voltmeter 34 as seen in FIGURE 1 is from a top view, to clearly show the relationship of members 40 and 41. Therefore, the calibration buttons, or switches 47 and 48, which have been labeled "right adjust" and "left adjust" respectively refer to the movement of scale indicator 45 of FIGURES 2 and 3, and not to the movement of member 41 as seen in FIGURE 1. The "right adjust," when related to FIGURE 1, calls for movement of member 41 in an upward direction, this corresponding to the movement to the right of indicator 45 of FIGURES 2 and 3. The "left adjust" calls for movement of member 41 in a downward direction, as related to FIGURE 1.

If it is initially assumed that member 41 lies directly adjacent member 40, then indicator line 45 of FIGURE 2 is completely off scale to the left of the zero point. The on-off switch 54 is moved to the on position to energize viewing light 42 by means of battery 55. The right adjust button 47 is then depressed and the voltage present at connector 46 is utilized to provide a reference charge on capacitor 30 to cause indicator 45 to move to the zero position, as shown in FIGURE 2. The manner of so charging capacitor 30 can be seen by tracing a circuit from the positive terminal of connector 46 through conductor 49, transformer secondary winding 28, diode 29, conductor 50, the upper plate of capacitor 30, the lower plate of capacitor 30, conductors 51 and 52, resistor 53, and right adjust switch 47 to the negative terminal of connector 46.

Capacitor 31 is also charged so that its left hand electrode is positive. This charge, or voltage, is applied to diode 29 to bias the diode to the threshold of conduction in preparation for a pulse from transformer 27.

The operator of the light meter views the scale glass 38 as the right adjust switch 47 is held in a closed position. The indicator 45 slowly moves into view and can be stopped at the zero position by releasing the right adjust switch.

If the indicator 45 should overshoot the zero position, then the left adjust switch 48 may be closed. The closing of this switch places resistors 53 and 56 in series with the closed switch 48 to provide a discharge path for capacitor 30. This causes the indicator 45 to move to the left, as related to FIGURES 2 and 3, and again as the indicator 45 moves into position at the zero point, the left adjust switch 48 may be released. As can be seen from FIGURE 1, the on-off switch 54 when in the off position provides a discharge path for capacitor 30 including resistors 53 and 56 connected in series.

As has been pointed out, the purpose of light meter 10 is to provide an accurate indication of the quantity of light which is available from a flash unit, such as flash unit 11, to illuminate a particular subject to be photographed.

The apparatus of the present invention allows a very accurate determination of proper camera adjustment for each particular situation.

If it is now assumed that indicator 45 has been placed at its reference position at the zero point on scale glass 38, such as shown in FIGURE 2, and such as described above, the photographer mounts or holds the electronic flash unit 11 and the light meter 10 with the flash unit 11 directed to illuminate the subject to be photographed and the photovoltaic cell 25 of the light meter to be subjected to the resulting light to be reflected from the subject.

The photographer then closes the flash switch 57. This switch is in parallel with the terminals of connector 46 and functions to short conductors 12 and 13. This causes trigger capacitor 21 of flash unit 11 to discharge through the primary winding of trigger transformer 20. As is well known, a high voltage pulse is thereby produced in the secondary winding of this transformer and electronic flash tube 18 is energized, capacitor 15 discharging through the flash tube to produce a short duration and brilliant flash of light to illuminate the subject to be photographed. This brilliant flash of light is sensed by photocell 25 and a corresponding pulse of voltage is thereby produced. This pulse of voltage appears as a pulse of voltage at the secondary winding 28 and is rectified by diode 29 to charge capacitor 30 through a circuit which can be traced from the upper terminal of winding 28 through diode 29, conductor 50, capacitor 30, conductors 51 and 52, capacitor 31, and conductor 49 to the lower terminal of winding 28. As has been pointed out, capacitor 30 is relatively small when compared to capacitor 31 and therefore the voltage build up on capacitor 30 as a result of the above traced circuit is large compared to the voltage decrease on capacitor 31. This voltage, being positive on the upper plate of the capacitor and negative on the lower plate of the capacitor, is applied to the electrostatic voltmeter 34 by means of conductors 32 and 33, as above described. Conductive cylinder 44 is connected to the negative plate of capacitor 30 by means of conductor 32 whereas members 40 and 41 of the electrostatic voltmeter are connected to the positive plate of capacitor 30 by means of conductor 33. The relative spacing of members 40 and 41, that is the distance through which member 41 moves, is dependent upon the magnitude of charge on capacitor 30. This in turn depends on the time integral of voltage generated by photovoltaic cell 25, this being a measurement of the amount of light energy reflected from the subject which has been illuminated by energization of electronic flash tube 18.

FIGURE 3 shows a representative view of the scale glass 38 after such a reading has been taken. In the specific illustration of FIGURE 3, the indicator 45 has moved up the scale to indicate a relative light quantity or integrated light intensity of 25.

If the photographer desires to repeat the reading, then the left adjust switch 48 may be closed to discharge capacitor 30, the photographer viewing the scale glass 38 and releasing switch 48 when the indicator 45 is returned to the zero position.

Whatever the reading, the photographer may then take this reading and, knowing the ASA film speed of the film which is in his camera, may refer to a table showing proper camera adjustment for the particular situation which he desires to photograph. The subject may then be photographed, utilizing electronic flash unit 11 to illuminate the subject, to produce the optimum illumination for this particular subject. As illustrated, connector 24 may be connected to the camera for a photograph to be taken.

From the above description it can be seen that I have provided an improved photographic light meter and particularly a light meter which may be utilized to measure the ability of a photographic flash unit to illuminate a particular subject to be photographed. With my arrangement, the many variables in the photographing of a particular subject, such as environment and reflecting properties of the subject, may be accurately taken into consideration when selecting proper camera adjustment. Modifications of the present invention will be apparent to those skilled in the art and it is therefore intended that the scope of the present invention be limited solely by the scope of the appended claims.

I claim as my invention:

1. Apparatus for measuring the quantity of energy present in a sudden burst of radiant energy, as distinguished from the ambient background radiant energy which may exist at the time that the sudden burst of energy takes place, comprising; photovoltaic means sensitive to the radiant energy to produce an output voltage of a steady magnitude in response to the ambient background energy and to produce an output voltage having a changing magnitude in response to the sudden burst of energy; a transformer having a first winding connected to said photovoltaic means and having a second winding; a rectifier, an electrostatic voltmeter; circuit means connecting said second winding, said rectifier, and said electrostatic voltmeter in a series circuit to thereby impress a D.C. voltage on said electrostatic voltmeter upon said photovoltaic means being subjected to a sudden burst of energy; and calibrating means including a source of D.C. voltage adapted to be connected to said electrostatic voltmeter to facilitate calibration thereof.

2. A photographic light meter for use in measuring the guide number of a photographic flash unit, comprising; a light sensitive photovoltaic cell, a transformer having a primary winding connected to said photovoltaic cell and having a secondary winding, a rectifier, a capacitor, means connecting said rectifier and capacitor in series to said secondary winding to thereby charge said capacitor upon said photovoltaic cell being subjected to a flash of light such as emitted from a photographic flash unit; an electrostatic voltmeter, means connecting said electrostatic voltmeter to said capacitor; and indicator means cooperatively associated with said electrostatic voltmeter to provide an indication of the quantity of light and thereby the guide number of the photographic flash unit which produced the flash of light to charge said capacitor.

3. In a photographic light meter; a photovoltaic cell characterized by the fact that it is sensitive to light energy which is generally in the visible spectrum, for example, the light produced by a photographic flash unit, said photovoltaic cell functioning to produce a steady state output voltage in response to steady state light energy and to produce a pulse of output voltage in response to a flash of light energy; a transformer having a primary winding connected to said photovoltaic cell and having a secondary winding; a rectifier, a capacitor, means connecting said rectifier and capacitor to said secondary winding to charge said capacitor when a voltage is induced in said secondary as a result of said photovoltaic cell being subjected to a flash of light, the magnitude of voltage on said capacitor being indicative of the quantity of light energy contained in the flash of light, an electrostatic voltmeter, means connecting said electrostatic voltmeter to said capacitor to thereby provide an indication of the magnitude of voltage on said capacitor; scale means cooperatively associated with said electrostatic voltmeter to facilitate the determination of the quantity of light energy contained in the flash of light; and further means including a source of D.C. voltage adapted to be selectively connected to said capacitor to place a reference voltage thereon to facilitate calibration of said electrostatic voltmeter.

4. A photographic light meter for use in determining the quantity of light produced by a photographic flash unit to thereby facilitate proper camera adjustment for photography to be achieved by means of the photographic flash unit, the light meter comprising; a photovoltaic cell sensitive to the presence of light energy and arranged to be subjected to the flash of light produced by the photographic flash unit, a transformer having a primary winding connected to said photovoltaic cell and having a secondary winding, rectifying means, a capacitor, circuit means connecting said rectifying means and capacitor in series to said secondary winding to thereby produce a D.C. voltage on said capacitor, the magnitude of the D.C. voltage being indicative of the quantity of light produced by the flash unit, an electrostatic voltmeter, circuit means connecting said electrostatic voltmeter to said capacitor, indicating means operatively associated with said electrostatic voltmeter to facilitate the determination of the quantity of light produced by the flash unit, a source of D.C. voltage, manually operable switch means selectively operable and effective to connect said source of D.C. voltage to said capacitor to produce a controlled reference voltage thereon to facilitate the calibration of said electrostatic voltmeter, and further manually operable switch means connected in shunting relation to said capacitor to facilitate the discharge of said capacitor to thereby discharge said capacitor after the quantity of energy available in a particular flash of light has been determined, to thereby place the light meter in condition to be used to determine the quantity of light in a subsequent flash of light.

5. In combination; an electronic flash unit having an electronic flash tube with a pair of main current conducting electrodes and a starting electrode, a source of voltage, means connecting said main current conducting electrodes to said source of voltage, a triggering network including said source of voltage, said starting electrode, and a first electrical connector outlet, said first connector outlet having a voltage present thereon and adapted when said first connector outlet is shorted to apply a voltage to said starting electrode to initiate a flash of light at said flash tube; a photographic light meter for use in determining the quantity of light energy present in the flash of light produced by said flash tube, said light meter having a photovoltaic cell adapted to be subjected to the flash of light to thereby produce a pulse of voltage, a transformer having a primary winding connected to said photovoltaic cell and a secondary winding, a capacitor, rectifying means, means connecting said capacitor and rectifying means in a series circuit to said secondary winding to thereby charge said capacitor to a voltage indicative of the quantity of light energy present in the flash of light, an electrostatic voltmeter, means connecting said electrostatic voltmeter to said capacitor, indicator means cooperatively associated with said electrostatic voltmeter to facilitate the reading of the intensity of light energy present in the flash of light, a second electrical connector outlet, first switch means manually operable to connect said second connector outlet to said capacitor, and second switch means normally operable to short said second connector outlet; and an electrical cord connected between said first and second connector outlets whereby said first switch is effective to apply a voltage to said capacitor to facilitate calibration of said electrostatic voltmeter, and said second switch is effective to short said first connector outlet to initiate a flash of light at said flash tube.

6. Apparatus for use in measuring the quantity of energy present in a sudden burst of radiant energy, comprising: photovoltaic means adapted to be subjected to the burst of radiant energy to produce an output voltage in response thereto, a transformer having a primary winding and a secondary winding, means connecting said primary winding to said photovoltaic means to thereby produce a voltage in the secondary winding in response to the burst of radiant energy, converting means connected to said secondary winding to produce a D.C. voltage whose magnitude is indicative of the quantity of energy present in the burst of radiant energy, an electrostatic voltmeter, and circuit means connecting said electrostatic voltmeter to said converting means, said electrostatic voltmeter thereby providing means for measuring the quantity of energy in the sudden burst, while being insensitive to steady-state radiant energy.

7. A light meter for use in measuring the quantity of light energy present in a sudden flash of light which may be produced by a photographic flash unit, comprising: photovoltaic means adapted to be subjected to the flash of light to produce a pulse of electrical energy in response thereto, a pulse transformer having a primary winding connected to said photovoltaic means and having a secondary winding; converting means connected to said secondary winding to produce a D.C. voltage whose magnitude is indicative of the quantity of light energy present in the flash of light, an electrostatic voltmeter, circuit means connecting said electrostatic voltmeter to said converting means to produce a voltage indication thereon when a pulse of electrical energy flows through said primary winding; and indicator means operatively associated with said electrostatic voltmeter to provide an indication of the quantity of light present in the sudden flash of light.

References Cited in the file of this patent
UNITED STATES PATENTS

| | | |
|---|---|---|
| 2,588,368 | Edgerton | Mar. 11, 1952 |
| 2,842,674 | Barstad | July 8, 1958 |